United States Patent
Evans et al.

(10) Patent No.: US 6,368,654 B1
(45) Date of Patent: *Apr. 9, 2002

(54) METHOD FOR MAKING FRUIT AND VEGETABLE PUREES

(75) Inventors: Willis DeWayne Evans, Fremont; Tracy A. Baker, Spring Lake; William P. Burnaw, Twin Lake, all of MI (US); Richard H. Friday, Alma, AR (US); Randall L. McDaniel; Robert A. Owens, both of Fremont, MI (US); Allen Bruce Zerlaut, Holton, MI (US)

(73) Assignee: Gerber Products Company, Fremont, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/902,135

(22) Filed: Jul. 30, 1997

(51) Int. Cl.⁷ .................................. A23L 1/212
(52) U.S. Cl. ............... 426/615; 426/330.5; 426/333; 426/481; 426/482; 426/484; 426/801
(58) Field of Search .................. 426/615, 481, 426/482, 484, 333, 330.5, 516, 801

(56) References Cited

U.S. PATENT DOCUMENTS

| | | |
|---|---|---|
| 1,295,943 A | 3/1919 | Welch |
| 2,536,176 A | 1/1951 | Harriss |
| 3,749,585 A | 7/1973 | Cruse et al. |
| 3,860,726 A | 1/1975 | Yamane |
| 4,022,922 A | 5/1977 | Nelson |
| 4,095,517 A | 6/1978 | Janovtchik et al. |
| 4,518,621 A | 5/1985 | Alexander |
| 4,643,085 A * | 2/1987 | Bertocchi .................. 99/510 |
| 4,873,106 A | 10/1989 | Kolodesh et al. |
| 4,937,088 A | 6/1990 | Gosselin et al. |
| 4,942,051 A | 7/1990 | Sardisco |
| 5,007,334 A | 4/1991 | Kobes et al. |
| 5,031,522 A | 7/1991 | Brixel et al. |
| 5,064,671 A | 11/1991 | Kock et al. |
| 5,096,719 A | 3/1992 | Gresch |
| 5,193,448 A | 3/1993 | Antonio |
| 5,229,160 A | 7/1993 | Lang |
| 5,244,685 A | 9/1993 | Metcalf et al. |
| 5,248,515 A | 9/1993 | Payton et al. |
| 5,359,926 A | 11/1994 | Sassi |
| 5,409,541 A | 4/1995 | Walker |
| 5,598,772 A | 2/1997 | Catelli |
| 5,616,357 A | 4/1997 | Hartmann |

FOREIGN PATENT DOCUMENTS

| | | |
|---|---|---|
| DE | 1175396 | 8/1964 |
| FR | 2517934 | * 12/1981 |
| SU | 0854356 | 5/1977 |

OTHER PUBLICATIONS

Gould, W. Tomato Production, Processing and Quality Evaluation, Avi Publishing Co., Inc. Vp. 154, 164, 165, 358, Westport, C N, 1974.*

Woodruf et al. Commercial Fruit Processing, Avi Publishing Co, Inc, Westport C N, p. 492, 1975.*

(List continued on next page.)

Primary Examiner—Helen Pratt
(74) Attorney, Agent, or Firm—Price, Heneveld, Cooper, DeWitt & Litton

(57) ABSTRACT

A method for making fruit and vegetables purees includes selecting raw produce of the type having meat with a cell structure that is not ruptured by cooking or macerating, and seeds and/or skins. The seeds and/or skins are separated from the meat at substantially ambient temperature by extruding the meat through perforations to form a cold break. The cold break is heated to a temperature which cooks the same into a puree. The puree is then finished to the desired texture and consistency.

28 Claims, 1 Drawing Sheet

OTHER PUBLICATIONS

Webster's Ninth New Collegiate Dictionary, Merriam–Webster Inc., Springfield, Massachusetts, p. 442, 1986.*

Fruits in Family Meals—A Guide for Consumers, Home and Garden Bulletin No. 125, U.S. Department of Agriculture, Washington, D.C., Issued Jan. 1968.

Family Circle® Illustrated Library of Cooking, vol. 9, Rockville House Publishers, Inc., Rockville Centre, New York 11570, ©1992.

* cited by examiner

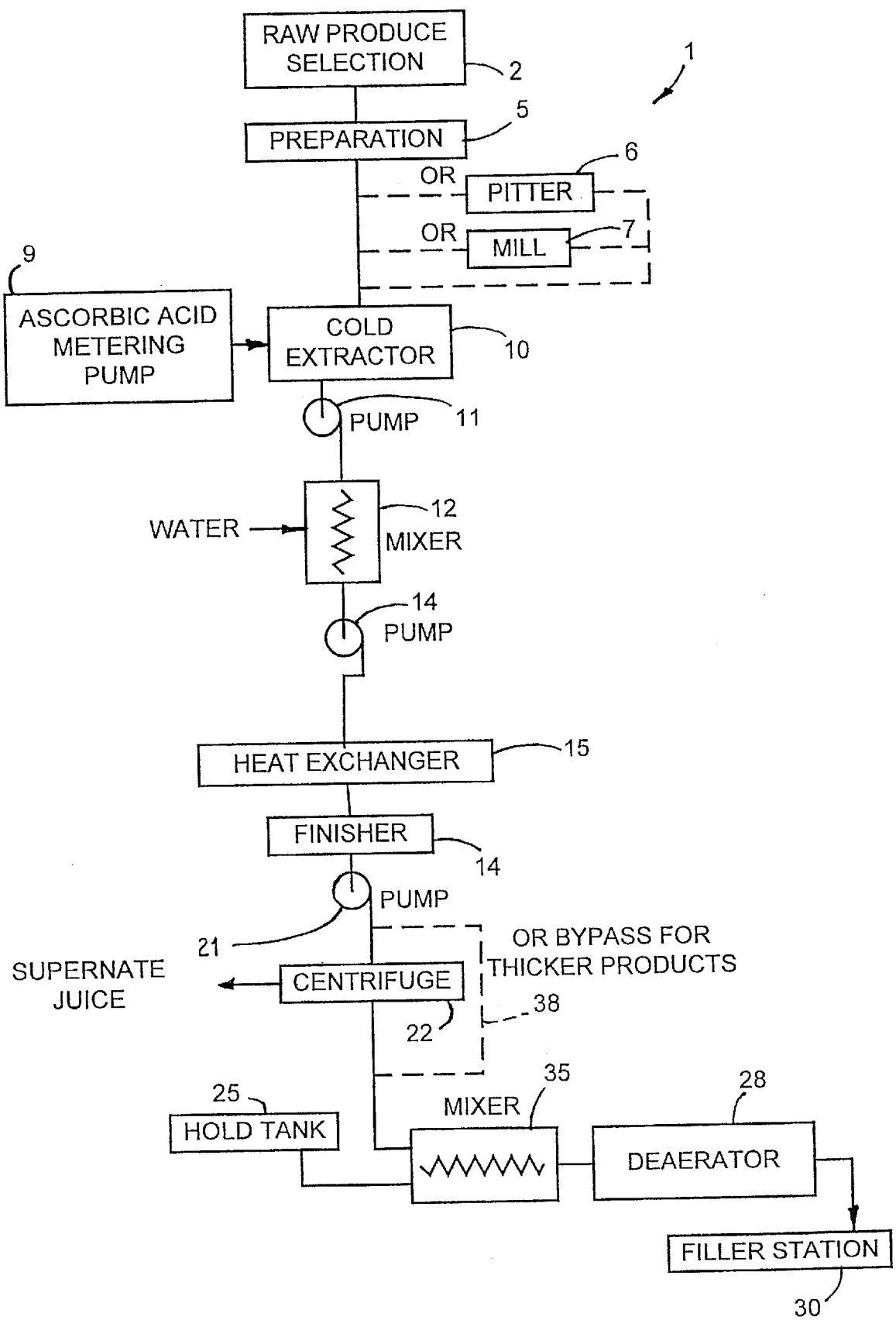

METHOD FOR MAKING FRUIT AND VEGETABLE PUREES

BACKGROUND OF THE INVENTION

The present invention relates to food processing, and in particular to a method and apparatus for making fruit and vegetable purees and the like.

Fruits and vegetables are frequently made into purees for preparing baby foods and other similar food products. Heretofore, raw fruit and vegetable produce were typically prepared using a screw steamer process, wherein the produce is exposed directly to hot steam to assist in rupturing or reducing the cell structure of the produce meat, and loosening the skins, stems, seeds and other offal prior to their separation from the meat.

While such processes have proven quite effective, there are certain drawbacks associated with this technology. For example, any pesticide residue or the like on the raw produce can be difficult to extract from the finished puree, as the direct steam cooking technique tends to cook such residues into the hot break. Furthermore, the direct steam cooking method can reduce the color and taste qualities of the puree, as well as its nutrient content. Also, the removal of skins, stems, seeds and other offal from the hot break often results in wasting a certain amount of the meat, so as to reduce the effective yield of puree from the raw produce.

SUMMARY OF THE INVENTION

One aspect of the present invention is to provide a method for making fruit and vegetable purees and the like. Raw produce of the type having meat with a cell structure that is not ruptured by cooking or macerating is selected. Skins, stems, seeds and/or other offal are then separated from the meat at substantially ambient temperature by extruding the meat through perforations to form a cold break. The cold break is heated to a temperature which cooks the same into a puree. The puree is then finished to the desired texture and consistency.

Another aspect of the present invention is to provide an apparatus for making fruit and vegetable purees and the like. A conveyor transports raw produce of the type having meat with a cell structure that is not ruptured by cooking or macerating. Skins, stems, seeds and/or other offal are then separated from the meat at substantially ambient temperature by a separator, which extrudes the meat through perforations to form a cold break. A heater heats the cold break to a temperature which cooks the same into a puree. A finisher then processes the puree into the desired texture and consistency.

The principal objectives of the present invention are to provide a process and apparatus for making fruit and vegetable purees having improved taste and color qualities, as well as increased nutrient content. The purees have reduced pesticide residue, as well as good texture and consistency. The process and apparatus provide an increased yield of puree from a predetermined amount of raw produce. The process and apparatus are particularly efficient in use, and economical to operate.

These and other advantages of the invention will be further understood and appreciated by those skilled in the art by reference to the following written specification, claims and appended drawings.

BRIEF DESCRIPTION OF THE DRAWINGS

FIG. 1 is a schematic view of a process and apparatus embodying the present invention.

DETAILED DESCRIPTION OF THE PREFERRED EMBODIMENTS

For purposes of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, step sequences, processing parameters, and other physical characteristics relating to the embodiments disclosed herein are not to be considered as limiting, unless the claims expressly state otherwise.

The reference numeral 1 (FIG. 1) generally designates an apparatus or system capable of practicing a method for making fruit and vegetable purees embodying the present invention. The present invention contemplates a selecting station 2, wherein raw produce of the type having meat with a cell structure that is not ruptured by cooking or macerating, is transported and/or collected for processing. Skins, stems and/or seeds associated with the raw produce are separated from the meat at a cold extraction station 10, wherein the meat is extruded through perforations at substantially ambient temperature to form a cold break. The cold break is transported to a heating station 15, where the same is heated to a temperature which cooks the break into a puree. The puree is then processed through a finishing station 20 to obtain the desired texture and consistency.

The apparatus and related process 1 illustrated in FIG. 1 are particularly adapted for use in the high volume, commercial manufacture of fruit and vegetable purees, of the type used in baby foods, and other similar foodstuffs. Unlike prior batch processing techniques, the present invention provides continuous processing of the raw produce at high speeds and high volumes for improved manufacturing efficiency.

In the illustrated example, the raw produce is selected in accordance with the type of puree desired, and typically includes a wide range of fruits and vegetables, including peaches, pears, apples, plums, carrots, beans, peas, sweet potatoes and squash. Preferably, all raw produce is initially cleaned at a preparation station 5 to remove debris, residue, and the like. Apples, pears, peaches and plums are sorted by size to facilitate the cold extraction step. Peaches may be peeled either by steam or lye. Peaches, plums and other similar fruits are also destoned at an optional pitter station 6 prior to cold extraction, using conventional machinery, such as a rotary dekernelling machine, like that produced by Tavalazzi. An optional mill station 7 is also provided if further reduction of the raw produce is needed.

The prepared raw produce is then conveyed or transported to, and processed in a cold extractor 10, wherein the skins, stems, seeds and other offal are separated from the meat at substantially ambient temperature by extruding the meat through perforations to form a cold break. There is no pre-cooking of the raw produce, so as to achieve better flavor, color and nutrient retention. In one example of the present invention, a turbo extractor of the type disclosed in U.S. Pat. No. 4,643,085, and manufactured by Bertocchi under Model Designation CX 10, has been used successfully to practice the cold extraction step. The turbo extractor 10 is provided with different perforated drums or screen meshes, which are selected in accordance with the type of raw produce from which skins, stems, seeds, peels and/or other offal are to be removed.

Preferably, ascorbic acid (vitamin C) is added to the cold break either during or immediately after the cold extraction step 10. The ascorbic acid assists in alleviating discoloration of the broken raw produce. In one example of the present invention, the ascorbic acid is added to the cold break while in the cold extractor 10 by using a metering pump 9.

The cold break is then preferably transported to a mixer 12 which serves to ensure complete disbursement of the ascorbic acid in the break, adds any necessary water, and improves the consistency of the break. In one example of the present invention, the cold break is transported from the cold extractor 10 to mixer 12 by a pump 11, such as a Moyno Model PP1134C. In one working embodiment of the present invention, mixer 12 comprises a Kenics static mixer, Model 4 KMR-SAN 6.

After the mixing step 12, the cold break is transported to a heat exchanger 15, wherein the cold break is heated to a temperature in the range of 200 to 250 degrees, and preferably around 220 degrees Fahrenheit. The puree is heated for a period of two to five minutes, and preferably around three minutes at a temperature of around 220 degrees Fahrenheit to achieve cooking. In one working example of the present invention, pumps 14, such as those manufactured by Moyno under Model Designations PP1134C and SP1021C, are used to convey the break to a tubular heat exchanger 15, such as that manufactured by APV Baker under the Model Designation CMTNT. The puree travels through the tubular portions of the heat exchanger, while hot water is injected into the casing portion of the heat exchanger to provide the heat source for cooking the break into a puree. Since the skins are removed from the raw produce prior to cooking, pesticide residuals are reduced.

The puree is then transported to a finisher 20 to achieve the desired texture and consistency. In one working example of the present invention, a turbo juice extractor is used as finisher 20, such as that manufactured by Bertocchi under Model Designation HX 20. Finisher 20 is provided with a variety of different perforated drums and/or screen sizes to achieve the desired texture and consistency for different types of purees.

In the event the finisher 20 is capable of achieving the desired texture and consistency, the puree is then transported to a hold tank 25, where the puree is stored until it is ready to be packaged. When the puree is ready to be packaged, the puree is pumped from the hold tank 25 through a deaerator to a filler bowl or station 30, where the same is filled into appropriately sized containers at a predetermined temperature, which is preferably no less than 180 degrees Fahrenheit.

If the puree is not of the desired consistency after being processed by the finisher 20, it is transported to a centrifuge 22, wherein liquid is separated to achieve the desired texture and consistency of the puree. The liquid removed from the puree by the centrifuge 22 can be processed for juice. In one working example of the present invention, the puree is transported from the finisher by a pump 21, such as a Waukesha Model U220 pump, to centrifuge 22, such as a clarifier decanter of the type manufactured by Westfalia under Model Designation CA 505-01-12. Unlike prior processing techniques, centrifuge 22 does not inherently concentrate the puree, or subject the same to any additional heat abuse.

After the puree is centrifuged, it is reheated to a temperature of approximately 200 to 215 degree Fahrenheit, where it is held for approximately 20 to 30 seconds, and then pumped through the deaerator 28 to the filler station 30.

In the illustrated embodiment of the present invention, a mixer 35 is disposed operably between hold tank 25, centrifuge 22 and deaerator 28. A by-pass line 38 permits the puree to be routed around the centrifuge 22, and directly into mixer 35 from finisher 20.

The present process and apparatus produces fruit and vegetable purees having improved taste and color qualities. The purees have reduced pesticide residue, as well as good texture and consistency. The present process and apparatus also provides an increased yield of puree from a predetermined amount of raw produce.

In the foregoing description, it will be readily appreciated by those skilled in the art that modifications may be made to the invention, without departing from the concepts disclosed herein. Such modifications are to be considered as included in the following claims, unless these claims by their language expressly state otherwise.

What is claimed is:

1. A method for making fruit and vegetable purees in a continuous process, comprising:

selecting raw produce of the type having meat with a cell structure that has not been ruptured by cooking or macerating, and having skins and/or seeds, to make a predetermined puree;

extruding the meat through perforations at an ambient temperature, thereby separating the skins and/or seeds from the meat to form a cold break;

moving the cold break along a conduit and raising the temperature of the cold break within the conduit to a temperature which cooks the cold break into the puree; and finishing the puree to achieve the desired texture and consistency by centrifuging the puree and removing sufficient liquid to achieve the desired texture and consistency of the puree.

2. A method as set forth in claim 1, including:

adding ascorbic acid to the cold break prior to said heating step.

3. A method as set forth in claim 2, including:

cleaning and sorting the raw produce prior to said separating step.

4. A method as set forth in claim 3, wherein:

said heating step comprises cooking the cold break for a period in the range of two to four minutes.

5. A method as set forth in claim 4, wherein:

said heating step comprises raising the temperature of the cold break to a temperature in the range of 200 to 250 degrees Fahrenheit.

6. A method as set forth in claim 5, wherein:

said acid adding step comprises adding the ascorbic acid to the cold break during said separating step.

7. A method as set forth in claim 6, including:

reheating the puree after said finishing step.

8. A method as set forth in claim 7, including:

deaerating the puree after said reheating step.

9. A method as set forth in claim 8, including:

pumping the puree to a container filling station after said deaerating step.

10. A method as set forth in claim 9, including:

mixing the cold break after said acid adding step and prior to said heating step.

11. A method as set forth in claim 10, wherein:

said selecting step comprises selecting the raw produce from a group consisting essentially of peaches, pears, apples, plums, carrots, beans, peas, sweet potatoes and squash.

12. A method as set forth in claim 11, wherein:

said selecting step comprises selecting the raw produce from a group consisting essentially of peaches and plums.

13. A method as set forth in claim 12, including:

destoning the raw produce prior to said separating step.

14. A method as set forth in claim 13, wherein:

said selecting step comprises selecting peaches as the raw produce; and including peeling the raw produce prior to said destoning step.

15. A method as set forth in claim 1, including:

adding ascorbic acid to the cold break prior to said heating step.

16. A method as set forth in claim 1, including:

cleaning and sorting the raw produce prior to said separating step.

17. A method as set forth in claim 1, wherein:

said heating step comprises cooking the cold break for a period in the range of two to four minutes.

18. A method as set forth in claim 1, wherein:

said heating step comprises raising the temperature of the cold break to a temperature in the range of 200 to 250 degrees Fahrenheit.

19. A method as set forth in claim 1, including:

adding ascorbic acid to the cold break during said separating step.

20. A method as set forth in claim 1, including:

reheating the puree after said finishing step.

21. A method as set forth in claim 1, including:

deaerating the puree after said finishing step.

22. A method as set forth in claim 1, including:

pumping the puree to a container filling station after said finishing step.

23. A method as set forth in claim 1, including:

mixing the cold break prior to said heating step.

24. A method as set forth in claim 1, wherein:

said selecting step comprises selecting the raw produce from a group consisting essentially of peaches, pears, apples, plums, carrots, beans, peas, sweet potatoes and squash.

25. A method as set forth in claim 1, wherein:

said selecting step comprises selecting the raw produce from a group consisting essentially of peaches and plums; and including preparing the raw produce prior to said separating step.

26. A method as set forth in claim 1, wherein:

said selecting step comprises selecting peaches as the raw produce; and including peeling the raw produce prior to said destoning step.

27. A method for making vegetable purees in a continuous process, comprising:

selecting at least one type of raw vegetable from a group consisting of carrots, beans, peas, sweet potatoes and squash, the selected vegetables having meat with a cell structure that has not been ruptured by cooking or macerating, and having skins and/or seeds, to make a predetermined puree;

extruding the meat through perforations at an ambient temperature, thereby separating the skins and/or seeds from the meat to form a cold break;

moving the cold break along a conduit and raising the temperature of the cold break within the conduit to a temperature which cooks the cold break into the puree; and finishing the puree to achieve the desired texture and consistency.

28. A method for making fruit purees in a continuous process, comprising:

selecting at least one type of raw fruit from a group consisting of peaches, pears, apples and plums, the selected fruit having meat with a cell structure that has not been ruptured by cooking or macerating, and having skins and/or seeds, to make a predetermined puree;

extruding the meat through perforations at an ambient temperature, thereby separating the skins and/or seeds from the meat to form a cold break;

moving the cold break along a conduit and raising the temperature of the cold break within the conduit to a temperature which cooks the cold break into the puree; and finishing the puree to achieve the desired texture and consistency.

* * * * *